Figure 1:
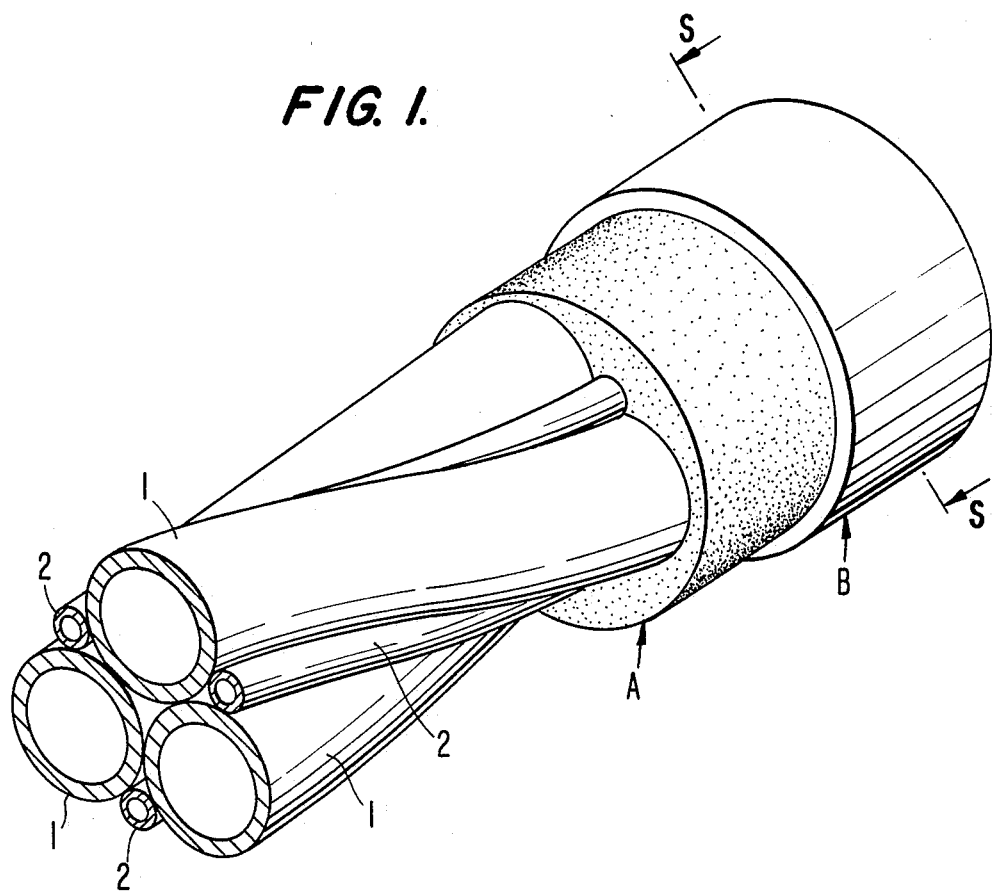

United States Patent [19]

Jarrin et al.

[11] Patent Number: 4,963,420

[45] Date of Patent: Oct. 16, 1990

[54] FILLER AND FLOATABILITY MATERIAL - MANUFACTURING PROCESS AND TUBULAR UNITS THAT INCORPORATE THIS MATERIAL

[75] Inventors: Jacques Jarrin; Eric Robert, both of Rueil-Malmaison, France

[73] Assignee: Institut Francais du Pétrole, Rueil Malmaison, France

[21] Appl. No.: 49,941

[22] Filed: May 15, 1987

[30] Foreign Application Priority Data

May 16, 1986 [FR] France .................. 86 12460

[51] Int. Cl.⁵ .............................................. B32B 1/08
[52] U.S. Cl. ..................................... 428/36.9; 174/28; 174/29; 428/372; 428/376
[58] Field of Search ....................... 174/28, 29, 110 F; 428/36, 372, 376, 35, 36.9

[56] References Cited

U.S. PATENT DOCUMENTS

| | | | |
|---|---|---|---|
| 2,488,211 | 11/1949 | Lemon | 174/29 X |
| 2,556,244 | 6/1951 | Weston | 174/29 |
| 2,998,472 | 8/1961 | Bondon | 174/28 |
| 3,126,438 | 3/1964 | Lorrin | 174/29 |
| 3,288,916 | 11/1966 | Koon | 174/110 F X |
| 3,699,237 | 10/1972 | Melia | 174/110 F X |
| 3,744,016 | 7/1973 | Davis | 174/110 F X |
| 3,935,632 | 2/1976 | Maxson | 264/45.4 |
| 4,219,791 | 8/1980 | Moore et al. | 501/94 X |
| 4,273,806 | 6/1981 | Stechler | 428/376 X |
| 4,324,453 | 4/1982 | Patel | 428/372 X |
| 4,705,914 | 11/1987 | Bondon | 174/29 X |

Primary Examiner—Lorraine T. Kendell
Attorney, Agent, or Firm—Antonelli, Terry, Stout & Kraus

[57] ABSTRACT

This invention concerns a new filler and floatability material as well as its manufacturing process.

For instance, this new material can be used as a filler and floatability material (A) which separates tubes or cables (1,2) in a tubular unit that includes an external sheath (B) surrounding a harness of tubes or cables (1,2).

In view of its make-up this material also participates in the thermal insulation of said tubes.

The invention concerns also such tubular units which incorporate the new material.

4 Claims, 3 Drawing Sheets

FILLER AND FLOATABILITY MATERIAL - MANUFACTURING PROCESS AND TUBULAR UNITS THAT INCORPORATE THIS MATERIAL

The invention concerns a new filler and floatability material, its manufacturing process, as well as tubular units that incorporate this material A technical sector where the invention can especially apply is that of integrated floatability materials in the assemblies of cables and/or tubes with large diameters and used in underwater oil applications, especially in bottom-surface links at marine depths greater than 100m.

The assembly of those tubes or cables with large diameters makes it possible to constrain the problems of bulkiness connected to anchoring, especially on an oil platform and also for better control of hydrodynamic phenomena connected to marine currents that can trigger the intertwining of cables or flexible tubes if they are laid isolatedly. On the other hand, assembling those cables or flexible tubes can produce a load or tension problem at the anchoring point when the weight of the assembly is too significant. By flexible tubes we mean tubes made by the assembly of one or several layers of plastic or rubber material, probably reinforced with metal wires (or synthetic fibers), designed to ensure tightness against internal or external fluids and to guarantee the maintenance of the tubes under lengthwise tension.

Such flexible tubes are manufactured and marketed for instance by the company COFLEXIP.

The apparent weight of those tubes when considered isolatedly in water filled with water can vary from 10 to 200 kg per meter, according to the structure of the tube and the nature of the pressure plates (metallic or compound).

The assembly of those flexible tubes leads to apparent weights in water and filled with water which can be very high, according to the size and the weight of each of those tubes. The assembly is achieved by twisting the tubes and/or cable with a 5 to 10 m step.

This invention relates to the installing of a new material for filling empty volumes of the assembly of cables and/or flexible tubes.

This new material which is comprised of 20 to 50% volume of a hollow lightening load, mineral or organic, with hydrostatic compression strength and displaying a slow recovery in water under pressures of about 10 to 100 bar, and 80 to 50% volume of a material comprised of at least 80% weight of a thermoplastic polyolefin or polydiolefin homo- or copolymer, displays the advantage of incorporating in the harness itself, during the manufacturing at the factory or at assembly, part of the floatability necessary for the harness. Therefore it makes is possible to limit floatability outside of the harness which is to be installed during the laying of the harness at sea.

To characteristics of this filler material are therefore to ensure partial floatability, even in the event of damaging the outer sheath of the harness which is always likely in harness maintenance tooling, during the manufacture or the laying at sea. This is obtained with a density included between 0.65 and 0.85 and water absorption that is limited to several per cent weight under hydrostatic pressure that is greater than 10 bar.

To possess mechanical properties (expecially elasticity and resistance to hydrostatic and uniaxial pressure) that are compatible with the envisioned application. Indeed, during manufacturing the harnesses are stored on drums of which the radius is such that 5% distortions are induced in the filler material. Furthermore, during handling throughout manufacturing or laying operations, the harnesses go inside the sorting or maintenance tri-chains/grousers (trichenille). The geometry of the plates for those chains/grousers and the forces needed for sorting are such that uniaxial pressures of about 50 bar are exerted upon the filler material.

The problem of integrating floatability within a flexible assembly of cables and tubes that are flexible, at marine depths greater than 100 meters, does not appear to have been genuinely broached.

The prior solutions usually apply to tubes or cables that are taken isolatedly and consist in some instances of fastening to the tube or cable floatability blocs that are made either of syntactic foam (for instance see U.S. Pat. No. 4 255 524), or of rigid expanded material Those two kinds of materials are rigid and therefore cannot be integrated within the flexible assembly proper during manufacture and especially the storing on a drum of the flexible assembly. Furthermore, aside from the high cost, the installing on the assembly of rigid floatability blocs slows down immersion operations. Therefore it is interesting to integrate part of the floatability during the manufacturing of the assembly, in order to limit as much as possible the loss of time connected to the fastening of outer floatability blocs during laying operations at sea.

With respect to cables that are taken isolatedly, solutions which involve depositing expanded plastic materials by injection have also been recommended in order to ensure thermal insulation (for instance, polyurethane foam according to patent DE 3110503).

This type of material usually displays very interesting elasticity and dersity, but the compromise needed between elasticity and uniaxial and hydrostatic compression strength places them quite at a disadvantage with regard to the material according to the invention described thereunder.

Another recommendation in the same field consists of wrapping, after treatment, expanded rigid PVC sheets around the duct that is handled isolatedly (FR 2 538 077). Needed elasticity and tightness can probably be guaranteed by inserting between expanded PVC blocs or marbles rubber that has been lightened by hollow glass micromarbles (FR 2 557 671). Those solutions display the major disadvantage of requiring very heavy installing operations, since they demand prior treatment of the PVC blocs and preforming of the floatability modules to be integrated during the assembly of tubes or cables that comprise the harness.

A prospection related to the insulation of electric cables has claimed moreover the possibility of depositing a layer made up of a thermoplastic material with a load of hollow microspheres (US 4 273 806). According to the method described in this previous patent, it is necessary to execute a prior mixture of the thermoplastic resin in the form of granulates or powder and glass micromarbles at a temperature which exceeds the softening temperature of the resin, this mixture being executed inside a BRANBURY type mixer so as to prepare a homogeneous mixture which is then granulated without breaking the microspheres and extruded or injected at very high temperatures (300° C. for polypropylene in examples 1 and 2 of the prior U.S. patent).

All the previously mentioned solutions apply to the thermal or electrical insulation of cables or tubes that are taken isolatedly. Those solutions never associate a capacity of continuous implementation with characteristics that are compatible with an application as a floatability material for marine depths that reach 1000 m in assemblies of flexible tubes or cables.

On the contrary, this invention makes it possible to associate inside the same material a continuous implementation by simple extrusion preceded by a step for mixing powders and mechanical and physico-chemical characteristics that are compatible with the handling and utilization conditions of the assemblies of flexible tubes made into harnesses.

After implementation, the material according to the invention displays a density ranging from 0.65 to 0.85, elasticity which is greater than 10% distortion, uniaxial compression strength equal to at least 60 bar and water absorption under 50 bar pressure which is lower than 5% weight.

Figure 2:
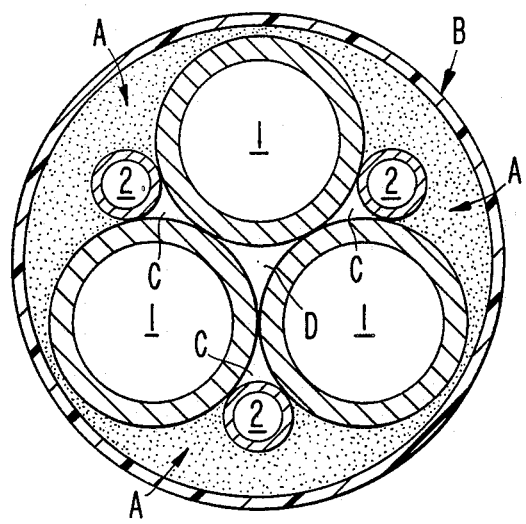
Figure 3:
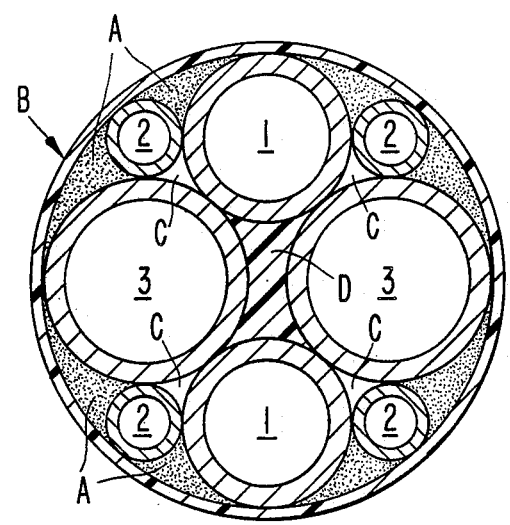
Figure 4:
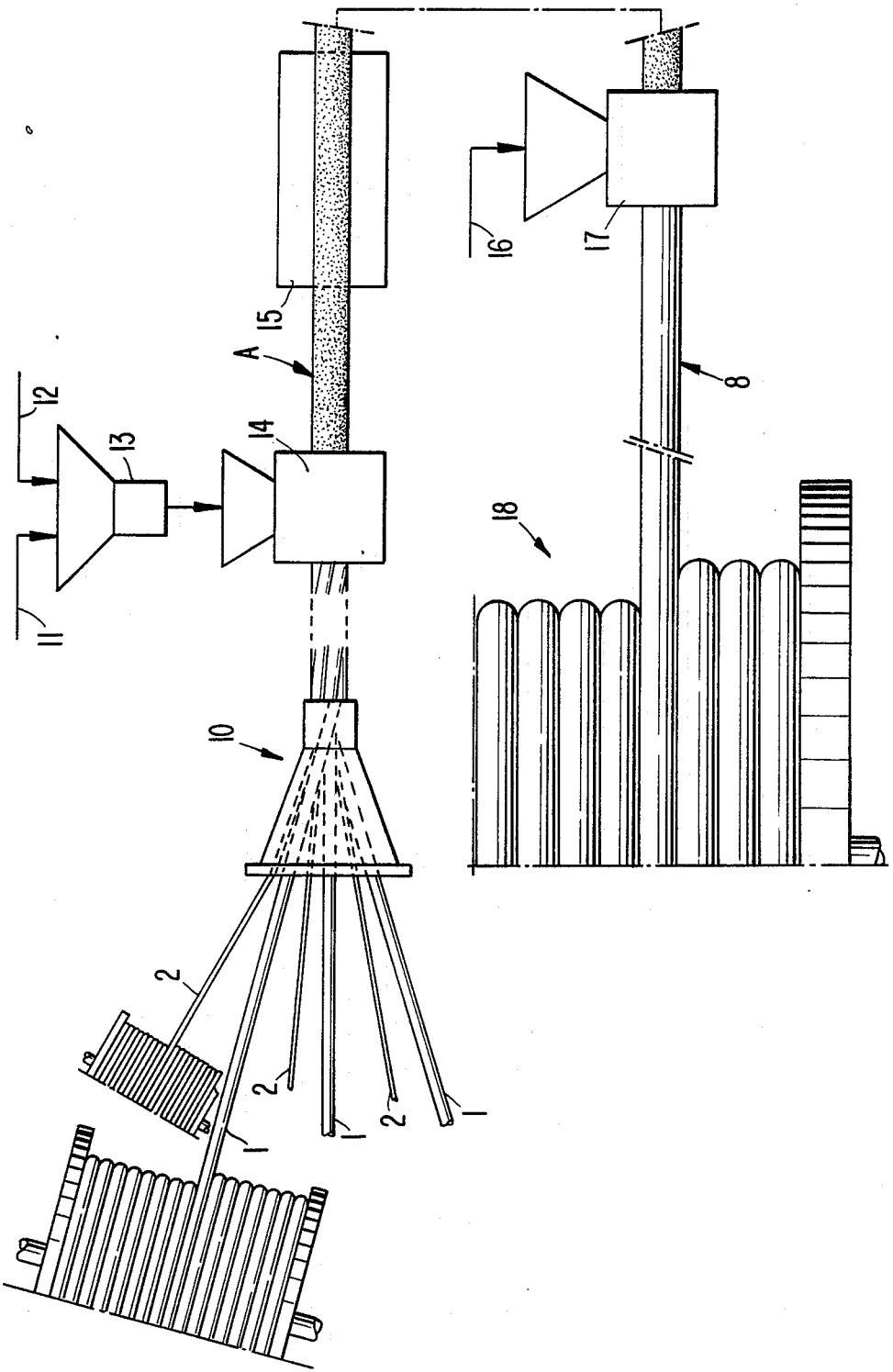

The invention is illustrated by the attached figures in which:

FIG. 1 schematically displays an assembly of flexible tubes,

FIG. 2 is a right section according to S—S of a tubular structure such as the one depicted in FIG. 1, FIG. 3 illustrates a structure that is more complex which includes four flexible tubes and, FIG. 4 schematically illustrates a manufacturing process for an assembly of flexible tubes that incorporates the material according to the invention.

FIG. 1 schematically displays an assembly of flexible tubes (1) and (2) that incorporates the filler and floatability material according to the invention (A). This material can be deposited either in such a way as to surround the tubes totally (case of FIG. 1), or only to fill the volumes included between the tubes. The unit is covered by an outer thermoplastic sheath (B).

FIG. 2 is a right sectional view according to S—S of a tubular structure such as the one displayed in FIG. 1. This figure displays an assembly of three flexible tubes (1) with a diameter of 1.5 inches and three flexible tubes (2) with a diameter of 4 inches.

This assembly is covered by the material of the invention (A) and an outer thermoplastic sheath (B). Furthermore, the volumes such as (C) and (D) are not filled by any material.

FIG. 3 illustrates a more complex structure that includes four flexible tubes (2) with a diameter of 1 inch two flexible tubes (1) with a diameter of 4 inches and two hydraulic umbilicals (3). This assembly is covered by the material according to the invention (A) and an outer sheath made of thermoplastic material (B). As in the previous structure, the volumes (C) are left empty; on the contrary, in order to ensure the hold and the assembly, the volume (D) is occupied by a core made of material according to this invention or comprised of any other thermoplastic material.

FIG. 4 schematically illustrates a manufacturing process of an assembly of flexible tubes that incorporates the material according to the invention.

This manufacturing process of a harness structure that incorporates the material of this invention includes the following steps:

(1) the assembly and the twisting (10) of the flexible tubes and/or cables (1), (2) to be associated within the flexible structure, (2) the mixing of the thermoplastic material (11) and lightening microspheres (12) inside a mixer (13) of the shaft mixer type.

(3) the extrusion-filling (14) of the material of this invention on the flexible assembly defined in step 1.

(4) the passage of the assembly covered with the material according to the invention inside a calibration - cooling vat (15).

(5) the sheathing of the harness that is obtained following step 4 with a thermoplastic material (16) through the extruder (17).

(6) the accommodation of the flexible harness on the storage drum (18).

By thermoplastic resin, we mean materials that are comprised of at least 80% weight homopolymers or copolymers which are ethylene- or propylene-based with a density included between 0.90 and 0.94, containing probably all the specific additives for this kind of material (oxidation inhibitor, anti UV, ... ). The granulometric distribution will be such that 80% weight of the particles will be smaller than 1 mm and the average size of the particles will range from 200 to 600.

By hollow glass microspheres we mean either microspheres such as those which are manufactured and marketed by the Companies EMERSON and CUMING, 3M or GLAVERBELL, or naturally occurring micromarbles which are marketed under the name of "flying ashes" and which come from a sifting of recovered soot in chimney dust collectors for power plants that operate on pulverized coal.

According to this preferred implementation mode of the invention, the hollow microspheres have the following make-up:

| $SiO_2$ 61% | $Al_2O_3$ 25% | $Fe_2O_3$ 3.3% |
|---|---|---|
| CaO 0.2% | $K_2O$ 3.4% | MgO 1.7% |
| determined: 5.4% | | |

Their true density equals about 0.68 and their apparent density 0.42. The granulometric distribution of those microspheres is as follows:

| cumulative residue | 147. = 18% |
|---|---|
| " | 104. = 61% |
| " | 74. = 77% |
| " | 74. = 23% |

We execute a mixture inside a so-called "shaft" mixer of the desired quantity of polyethylene powder or other polyolefin homo- or copolymer with the characteristics mentioned above and the corresponding quantity of flying ashes. This powder mixture is achieved at ambient temperature in several minutes and does not display any segregating phenomena at storage.

The mixture that is obtained is directly introduced inside the hopper of an extruder that is fitted with a screw possessing a low compression ratio and a die in the shape of a crosshead that enables the extrusion-filling of the filler material as previously defined at the usual implementation temperatures of the thermoplastics used and at pressures lower than about 100 bar at the entrance of the die.

It has emerged rather surprisingly that a direct feed of the extruder with a mixture of polyolefin powder and flying ashes was more advantageous from the standpoint of the breaking of the microspheres under our extrusion conditions than a prior mixture at the molten state of the same ingredients. This mixture, which can be followed by granulation, in fact multiplies the breaking potential of the microspheres.

EXAMPLE 1

500 g of low density polyethylene (d=0.92, MFI=20 according to ASTM D 1238) at the powdered state of average granulometry equal to 300 is mixed for 2 minutes inside a shaft mixer with 246 g of flying ashes such as those previously defined.

The mixture is then extruded on a single screw (monovis) machine of a diameter of 19 mm and compression ratio of 1, fitted with a rod die with successive diameters of 3, 5 and 10 mm. The temperatures displayed on the machine are respectively 130°, 140° and 150° C. on the sheath and 150° C. for the die.

The results obtained on the rod are shown in the following table:

| diameter of the die | D tr/mn | density (1) | Uniax. comp. UR MPa (2) | traction E MPa (3) | ER (%) (3) | water absorp. 50 bar at 1000 h (%) (4) |
|---|---|---|---|---|---|---|
| 3 | 40 | 0.82 | — | — | — | — |
| 5 | 40 | 0.79 | 8.0 | 350 | 16 (2) | 1.9 |
| 10 | 60 | 0.76 | 7.8 | 200 | 19 | 1.2 |
| 10 | 80 | 0.77 | 7.6 | 300 | 17 | 1.3 |

(1) density mensured in HUBBARD pycnometer inside isopropyl alcohol
(2) off-standard cylinder
(3) ASTM D 638
(4) 300 mm long rod

EXAMPLE 2

500 g of polyethylene from example 1 are mixed for 2 minutes inside a shaft mixer with 333 g of flying ashes. The mixture is extruded on the single screw machine from the previous example fitted with rod dies with successive diameters of 5 and 10 mm. The temperature conditions stay the same in relation to example 1.

| diameter of the die | D tr/mn | density | Uniax. comp. UR MPa (2) | traction E MPa (1) | ER (%) (1) | water absorp. 50 bar at 1000 h (%) |
|---|---|---|---|---|---|---|
| 5 | 40 | 0.77 | 6.4 | 280 (2) | 20 (2) | 4.5 |
| 10 | 60 | 0.77 | 6.6 | 220 | 18 | 2.2 |

(2) off-standard cylinder
(1) ASTM D 638

EXAMPLE 3

In this example the extrusion conditions are those of example 1 and 2. The polyethylene that is used is also that which is described in the previous examples.

500 g of polyethylene are mixed respectively with 158 g (composition 1) and 269 g (composition 2) of a fraction of flying ashes such as those previously used. This fraction is obtained by floatability of said flying ashes with pentane. After decanting we recover a remaining fraction of which the characteristics are as follows:

| true density of about 0.54 granulometric distribution: | | |
|---|---|---|
| Cumulated residue at | 154 | 11% |
| | 103 | 51% |
| | 65 | 86% |
| shifting to | 65 | 14% |

The results obtained on each of the compositions are shown in the following table.

| diameter of the die | D tr/mn | density | traction module MPa | break lengthen. | water absorp. 50 bar at 1000 h (%) |
|---|---|---|---|---|---|
| Composition 1 | | | | | |
| 5 | 40 | 0.75 | — | — | 1.8 |
| 10 | 60 | 0.74 | 240 | 21 | 0.9 |
| Composition 2 | | | | | |
| 5 | 40 | 0.72 | — | — | 3.9 |

EXAMPLE 4

In this example we extruded composition n° 2 from the previous example with a screw at a compression ratio of 2.5, or greater than that previously used.

The results obtained with a rod die that has a 5 mm diameter are as follows:

| D tr/mn | density | water absorp. 50 bar at 1000 h (%) |
|---|---|---|
| 40 | 0.84 | 1.4 |
| 60 | 0.85 | 1.4 |

COMPARATIVE EXAMPLE 5

500 g of a low density polyethylene (d=0.92 MFI 2.16/190=7 according to the ASTM D 1238) at the powder state are mixed for 2 minutes inside a shaft mixer with 333 g (composition 1) or with 246 g (composition 2) of flying ashes.

The mixture is extruded on the single screw machine that was previously described and fitted with the same rod dies. The temperatures of the different zones of the sheath and of the die are also preserved.

The results that were obtained are shown in the table below.

| die | tr/mn | density | uniax. resist. break MPa | Traction module MPa | break lengthen. (%) | water absorp. 50 bar at 1000 h (%) |
|---|---|---|---|---|---|---|
| Composition 1 | | | | | | |
| 5 | 40 | 0.78 | — | — | — | 24 |
| 10 | 40 | 0.74 | 7.3 | 350 | 22 | 10 |
| Composition 2 | | | | | | |
| 10 | 60 | 0.78 | — | 300 | 30 | 4.1 |

The comparative tests from examples 3 and 4 indicate that during extrusion of a mixture of polyethylene powder and flying ashes, the breaking of lightening microspheres can be substantially reduced by the use of a screw with a very low compression ratio. Furthermore, the comparative tests of examples 1, 2 and 5 indicate that the properties of water absorption under hydrostatic pressure of the extruded material deteriorate as the load ratio of microspheres increases, but improve through the use of a polyethylene with a high fusion index.

EXAMPLE 6

500 g of polyethylene from example 1 are mixed respectively with 88 g (composition 1) and 138 g (composition 2) of glass microspheres B 38/4000 marketed by the 3M company. The mixture is extruded on the single screw machine of example 1 fitted with a 10 mm diameter rod die. The temperature conditions are the same than those used in example 1.

The results obtained on the extruded rods are gathered in the table below.

| D tr/mn | density | uniax. resist. break MPa | Traction module MPa | break lengthen. (%) | water absorp. 50 bar at 1000 h (%) |
|---|---|---|---|---|---|
| | | | Composition 1 | | |
| 60 | 0.70 | 6.5 | 205 | 26 | 1.4 |
| | | | Composition 2 | | |
| 60 | 0.64 | 7.0 | 250 | 7 | 1.9 |

EXAMPLE 7

We extruded at a rod temperature which is equal to 170° C., on the single screw that is previously described and fitted with rod die with a diameter of 10 mm, a mixture of 500 g with a styrene-butadiene-styrene thermoplastic rubber which is marketed by the SHELL company in the name of CARIFLEX TR and 250 g of flying ashes. The rubber is previously reduced into powder by cryogenic crushing.

The density that is measured on the material thus obtained is equal to 0.81.

We claim:

1. A tubular harness structure which comprises a plurality of tubes that are arranged in close contact with each other thereby providing an assembly of flexible tubes, the assembly being surrounded by an outer sheath made of thermoplastic material, and a floatation material incorporated between the tubes and the outer sheath; said material containing 50–80% by volume of a olefinic homopolymer or copolymer and 50–20% by volume of hollow particulate fly ash microspheres naturally obtained from the soot of pulverized coal power plants.

2. A tubular structure according to claim 1, wherein said floatation material is incorporated between the tubes and the outer sheath by extrusion filling of the material during assembly of the tubes.

3. A tubular structure according to claim 1, wherein said plurality of tubes include at least two different groups of tubes each group having a diameter different from the other; said groups of tubes being twisted together to form a harness-like assembly with voids being formed between individual tubes of the assembly.

4. A tubular structure according to claim 3, wherein at least one of the voids between the tubes is filled with a thermoplastic material.

* * * * *